3 Sheets—Sheet 1.

W. M. WILKIN.

RECIPROCATING SAW MILL.

No. 10,882. Reissued Nov. 15, 1887.

Witnesses
Wm. A. Coutland,
Chas. P. Lehmer

Inventor.
Wm. M. Wilkin
by Hallock & Hallock
attys

N. PETERS, Photo-Lithographer, Washington, D. C.

W. M. WILKIN.

RECIPROCATING SAW MILL.

No. 10,882. Reissued Nov. 15, 1887.

Witnesses
Wm A Coutland
Chas. P. Lechner

Inventor.
Wm. M. Wilkin
by Hallock & Hallock
attys.

N. PETERS, Photo-Lithographer, Washington, D. C.

W. M. WILKIN.

RECIPROCATING SAW MILL.

No. 10,882. Reissued Nov. 15, 1887.

Witnesses
Wm A Courtland
Chas. A. Lechner

Inventor.
Wm. M. Wilkin
by Hallock & Hallock
attys

N. PETERS, Photo-Lithographer, Washington, D. C.

UNITED STATES PATENT OFFICE.

WILLIAM M. WILKIN, OF ERIE, PENNSYLVANIA.

RECIPROCATING-SAW MILL.

SPECIFICATION forming part of Reissued Letters Patent No. 10,882, dated November 15, 1887.

Original No. 338,124, dated March 16, 1886. Application for reissue filed June 15, 1887. Serial No. 241,418.

*To all whom it may concern:*

Be it known that I, WILLIAM M. WILKIN, a citizen of the United States, residing at Erie, in the county of Erie and State of Pennsylvania, have invented certain new and useful Improvements in Reciprocating-Saw Mills; and I do hereby declare the following to be a full, clear, and exact description of the invention, such as will enable others skilled in the art to which it appertains to make and use the same.

This invention relates to that class of reciprocating-saw mills which are known as "gangs;" and it consists in certain improvements therein, which will be hereinafter fully described, and pointed out in the claims.

My invention consists in combining with the saw-sash a counter-balance or compensating balance in the manner and for the purposes hereinafter set forth.

The use of counter-balance in machines having reciprocating parts is common and the purpose thereof is well understood. It has been applied to the crank-shaft in the form of a weight on the opposite side of the shaft from the crank, and it has been mounted in slides and connected to an oppositely-arranged crank and made to reciprocate in opposition to the reciprocating parts which it is to balance. It has been common to partially counterbalance the reciprocating parts of a gang-saw mill by a revolving counter-weight; but this, if heavy enough to actually counterbalance the reciprocating parts, will produce great lateral throw or vibration, which is very objectionable.

I am not aware that a reciprocating counter-balance has ever been, before my invention, applied to a gang-saw mill, although it has been used in other machines, particularly in steam-engines.

I have found that the application of a reciprocating counter-balance to a gang-saw mill necessitated the devising of certain special features of construction, and produces many new and useful results when properly accomplished.

Figure 1:
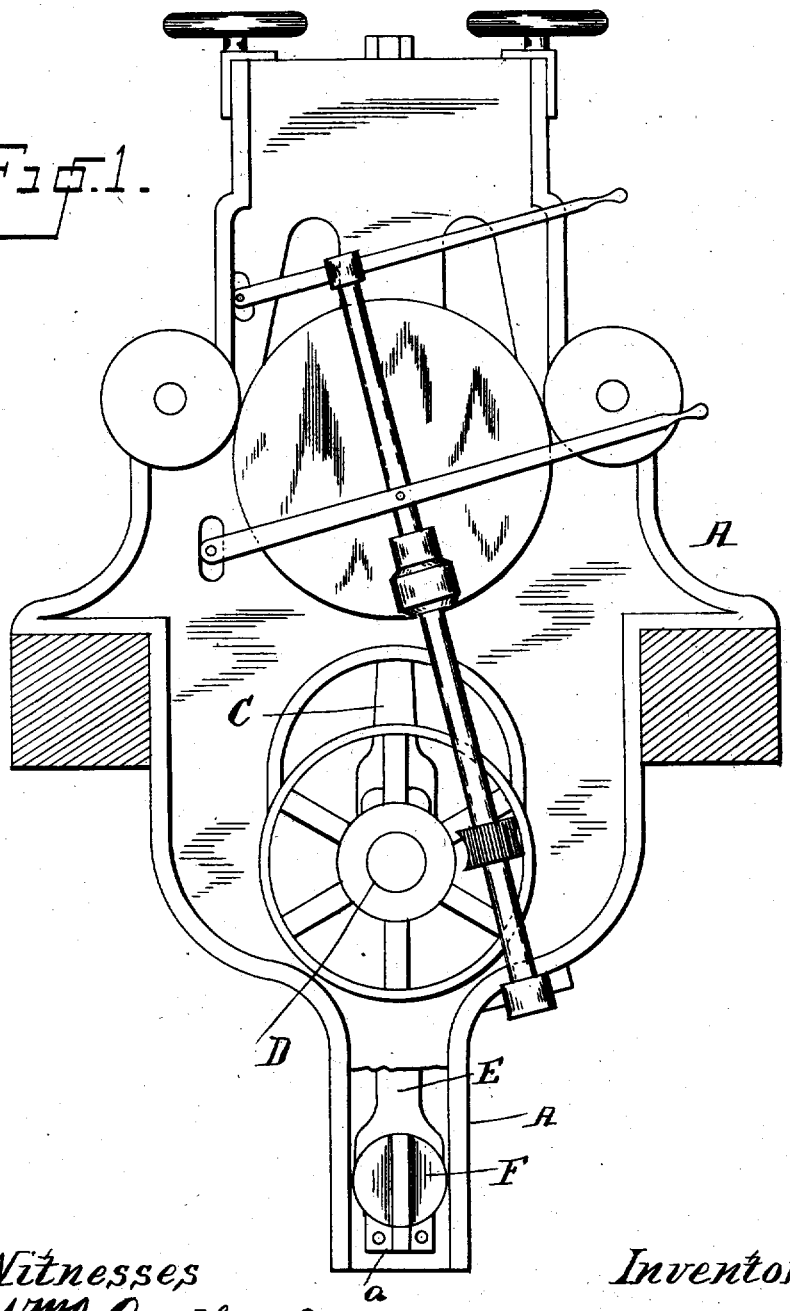
Figure 2:
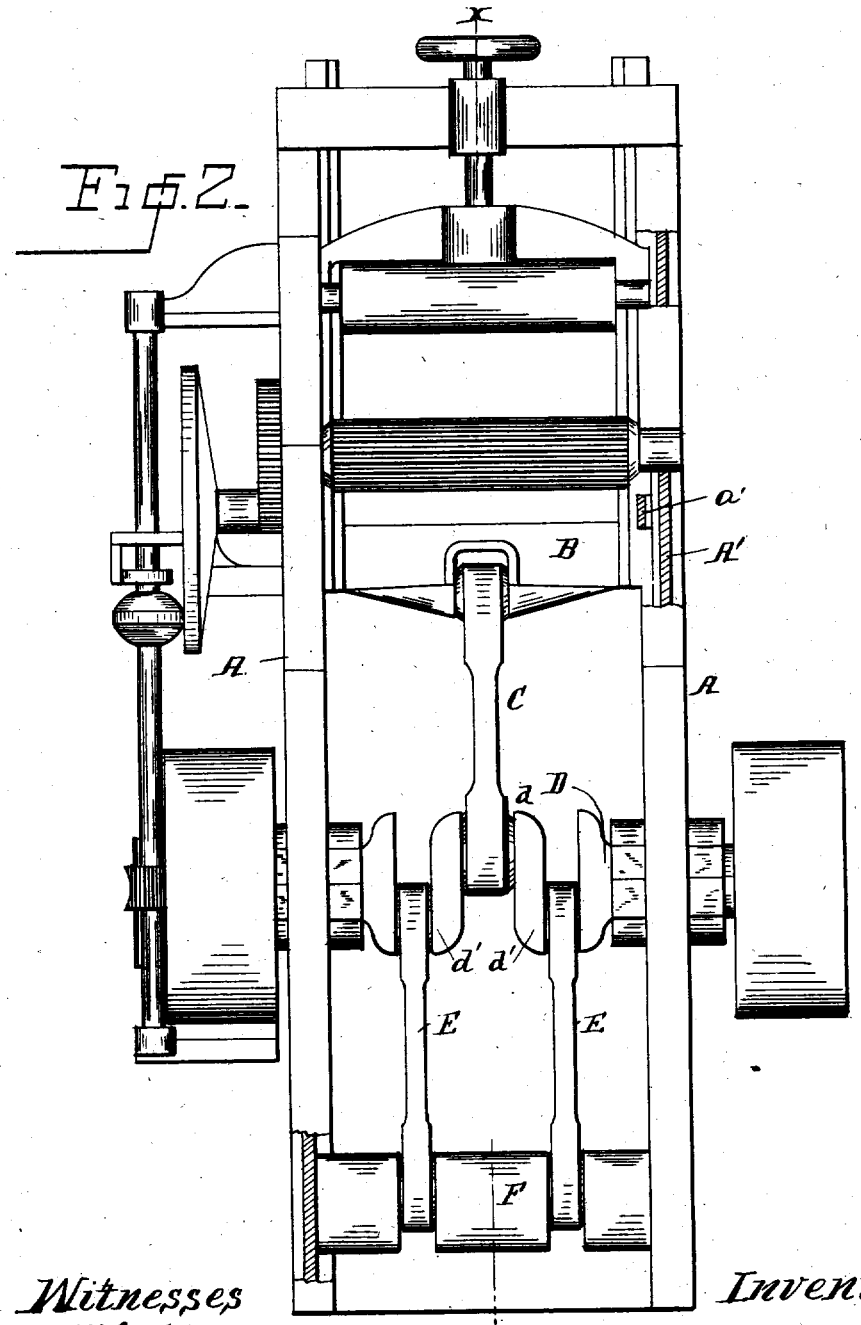
Figure 3:
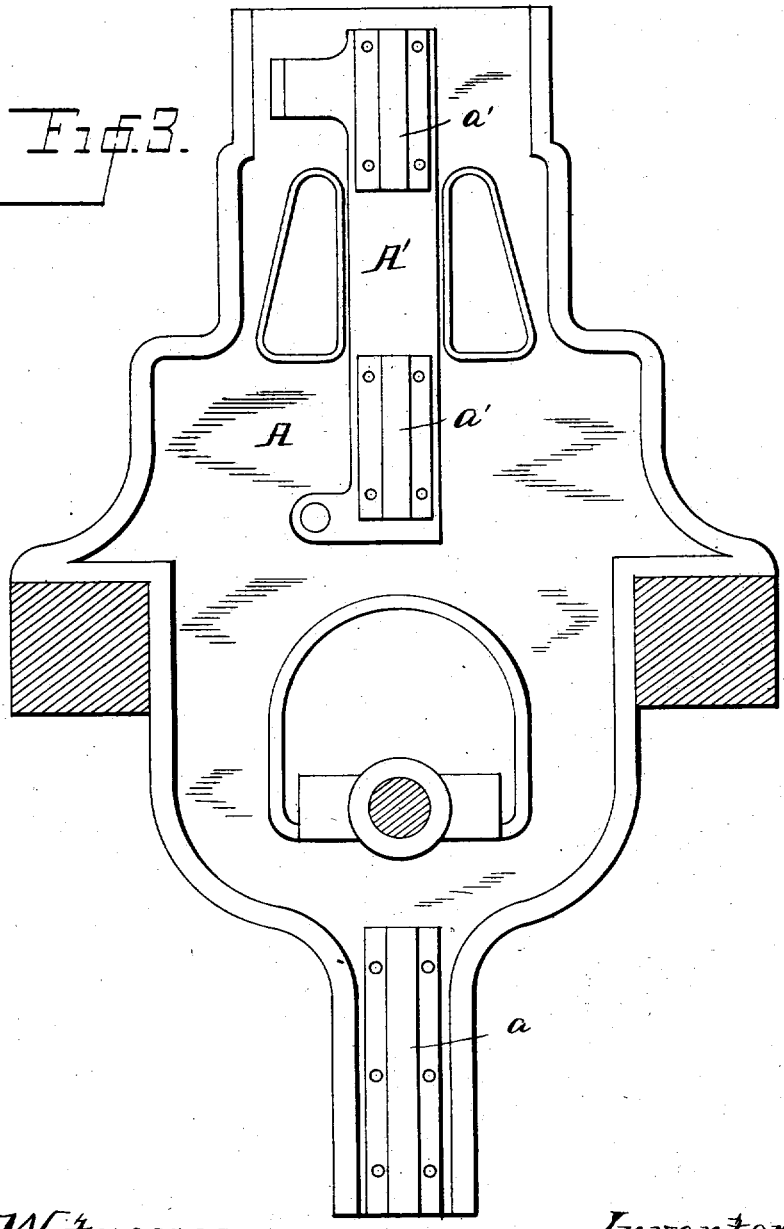

My invention is illustrated in the accompanying drawings, as follows: Figure 1 is a side elevation of a gang-saw mill having therein embodied my improvements. Fig. 2 is a front elevation of the same. Fig. 3 is a side elevation of the inside of the frame A, showing the guides *a a'* and the pivoted side pieces, A', on which the guides *a'* are mounted.

Letters of reference indicate like parts, as follows:

A is the frame.

B is the sash.

D is the main crank-shaft, which drives the sash.

C is the connecting-rod between the sash and the main crank-shaft.

F is the counter-balance.

E E are connecting-rods between the main crank-shaft and the counter-balance.

*a a* are the guides on the sides of the frame in which the counter-balance slides.

*d* and *d' d'* are the cranks of the crank-shaft D.

*a' a'* are the guides for the saw-frame, which are mounted on the pivoted side pieces, A'.

A' are side pieces bearing the guides *a' a'*.

The line *x x* in Fig. 2 indicates a vertical plane, which cuts the shaft at right angles and passes through the center of gravity of the sash B and the counter-balance F.

The construction shown is as follows: The saw-sash B is guided in guides *a' a'* on the cheek-piece A' in the usual manner, and a crank-shaft, D, is journaled in the frame A in proper position, and is provided with proper connections for reciprocating the shaft. A properly-formed weight, F, is guided in guides *a a* on the frame A, and is connected with cranks *d' d'* on the main crank-shaft by proper connecting-rods, E E. The cranks which operate one of the reciprocating parts are opposite the crank which moves the other reciprocating part, so that said parts will move in opposite direction simultaneously, and these cranks and the connections are so arranged that the power exerted by the crank-shaft to drive each of the said reciprocating parts is equally divided on opposite sides of a vertical plane which cuts said shaft at right angles and passes through the center of gravity of both of said reciprocating parts. The object in thus adjusting the two reciprocating masses with relation to the crank-shaft is to prevent lateral or horizontal vibration. For example, if there were but two cranks in the crank-shaft, one in opposition to the other, then the two reciprocating masses would have to move in different vertical planes, or if they moved in the same vertical plane the power exerted to move them would not be equally distributed on opposite sides of the point where said plane would cut the crank-shaft, and hence lateral vibration would be generated, which would rack the frame-work, produce undue friction, and shorten the life of the machine.

The useful results gained by the employment of a reciprocating counter-balance are as follows: The load or labor of reciprocating the sash is divided throughout the revolution of the crank-shaft, and hence jar and concussion are obviated; and when this is done without producing lateral vibratory action a much lighter frame is required, and the mill may be mounted on the timbers of the building in which it is used, while mills not having such a counter-balance require to be mounted on massive stone foundations independent of the frame-work of the building, and thus the cost of construction and erection is very greatly lessened. There being no concussion or lateral vibration in the operation of the machine, the life will be greatly prolonged and a higher rate of speed can be maintained in its operation, and hence more work accomplished in a given time.

A mill thus provided with a perfectly-adjusted reciprocating counter-balance will require less power to operate it than the same mill not so provided.

What I claim is—

1. In a reciprocating saw mill, the combination, substantially as set forth, of a reciprocating-saw frame, a reciprocating counter-balance, a crank-shaft, and proper connecting-rods for operating said reciprocating parts, which crank-shaft has three cranks, the middle one of which stands opposite the other two and revolves in a plane which cuts the axis of the crank-shaft and the wrist-pin of said middle crank at right angles and passes through the center of gravity of the said reciprocating parts.

2. In a reciprocating-saw mill, the combination, substantially as set forth, of a crank-shaft having three cranks, the middle one of which stands opposite the others, and a vertically-reciprocating saw-frame and a vertically-reciprocating counter-weight, which are connected with said cranks by proper connections in a manner substantially as shown, whereby the said reciprocating parts will be moved simultaneously in opposite directions and the exertion on the crank-shaft of moving each of said parts will be equally divided on opposite sides of a vertical plane which cuts said crank-shaft at right angles thereto and passes through the center of gravity of both of said reciprocating parts at right angles to the plane in which they reciprocate.

3. In a reciprocating-saw mill, the combination, substantially as set forth, of a frame-work, a saw-frame mounted in guides on said frame-work so as to be reciprocated vertically, a counter-weight also mounted in guides on said frame-work so as to be vertically reciprocated, a crank-shaft having three cranks, the middle one of which stands opposite the other two and mounted in said frame-work between the two reciprocating parts, and connecting-rods connecting said oppositely-placed reciprocating parts with the said cranks in a manner substantially as shown, whereby the said saw-frame and weight will be simultaneously reciprocated in opposite directions and the exertion of moving each of said parts shall be divided equally on opposite sides of a vertical plane which passes through the axis of said crank-shaft and the middle of the wrist-pin of said middle crank at right angles thereto and through the center of gravity of both said reciprocating parts.

WILLIAM M. WILKIN.

Witnesses:
JNO. K. HALLOCK,
WM. A. COURTLAND.